Dec. 31, 1940.   P. R. FAIRBANKS   2,226,901
DUMP TRUCK GATE CLOSING DEVICE
Filed July 4, 1939
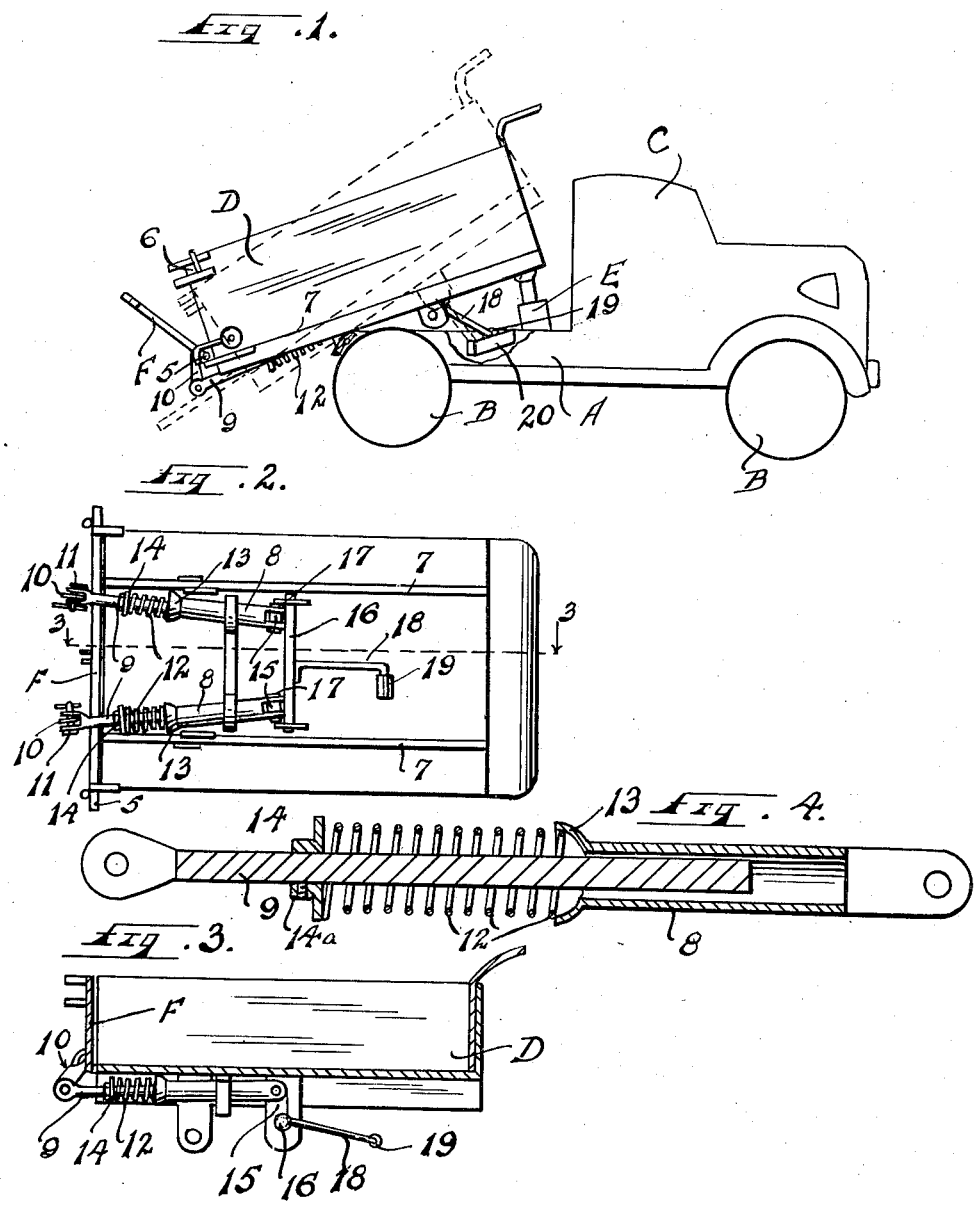
Inventor
Philip R. Fairbanks
By R. M. Thomas
Attorney Patented Dec. 31, 1940

2,226,901

UNITED STATES PATENT OFFICE 2,226,901

DUMP TRUCK GATE CLOSING DEVICE

Philip R. Fairbanks, Ogden, Utah

Application July 4, 1939, Serial No. 282,764

3 Claims. (Cl. 298—23)

My invention relates to trucks and more particularly to those types of trucks commonly termed "dump trucks," and has for its object to provide a new and highly efficient automatic tail gate for said truck beds. The mechanical principles of this device were devised for the purpose of creating a dump bed of conventional type with a positive automatic "tail gate" release which, when the truck dump bed is elevated, lowers the "tail gate" to a horizontal plane in line with the bottom of the bed.

A still further object is to provide an automatic tail gate for dump beds which automatically opens and closes when the truck body has been elevated for dumping and returns to its loading position.

A still further object is to provide a tail gate for dump beds on conventional types of trucks which, if struck by the shovel of a loading mechanism such as a steam shovel, will yield sufficiently to allow the truck to be withdrawn without the usual danger of breaking the truck or the shovel.

These objects I accomplish with the device illustrated in the accompanying drawing in which similar numerals and letters of reference indicate like parts throughout the several views, and as described in the specification forming a part of this application and pointed out in the appended claims.

In the drawing,

Figure 1 shows a side elevation of a dump truck with the body or bed slightly elevated, dotted lines indicating a full elevated position showing the tail gate completely open.

Figure 2 is an inverted plan view of the dump bed showing my mechanism for controlling the tail gate.

Figure 3 is a longitudinal section on line 3—3 of Figure 2.

Figure 4 is a longitudinal section diametrically through one of the operating mechanisms.

In the drawing I have shown the truck chassis as A; the wheels as B; the cab as C; and pivotally mounted to the rear end of the chassis A is the usual dump bed B. The dump bed is controlled and operated in the conventional manner by the hydraulic cylinder E. At the rear end of the dump body D the tail gate F is pivotally mounted on pivot pins 5, one at each side of the tail gate. The top end of the tail gate is preferably made so that it may be locked by the conventional lock member 6, or may swing free for use as an automatic tail gate to open when the truck body is elevated and close when the truck body is returned to its loading position. Under the body and between the stringers 7, I provide my automatic control. The automatic control consists of two spaced-apart cylindrical or tubular members 8, one at each side of the dump body between the stringers. These cylindrical members carry floating shafts 9 therein, with the front ends of the shafts carried in the cylindrical members and slidable therewithin and the rear ends of the shafts being bifurcated to engage depending short control arms 10. The control arms 10 are rigidly secured onto the back side of the tail gate F, spaced apart and near the lower edge thereof. Pivot pins 11 are passed through the bifurcated ends of the floating shafts 9 and through the ends of the arms 10 to lock them together into operative correlation. Compression springs 12 are carried on the shafts 9 between enlarged spring cups 13 on the ends of the members 8 and spring stops or collars 14, which are secured onto the shafts 9. The front end of each of the tubular members 8 is bifurcated and between these, the bifurcated ends the crank arms 15 of the floating or control shaft 16 are mounted and carried. Pivot pins 17 are passed through these joints to hold the two members together. The control shaft 16 has a depending operating arm 18 secured on one side thereof with the free end of the arm 18 carrying a roller 19, which roller is adapted to roll upon a track or race 20 mounted on the truck chassis A. This race 20 may be adjustably mounted on the chassis if desired. The collar 14 may be screwed onto the shaft 9 to make it adjustable or may be provided with a flange 14a as shown in Figure 4, with a set screw to adjustably secure the collar 14 in a predetermined position on the shaft 9.

The operation of the device is as follows:

With the roller 19 resting upon the race 20, and with the bed D in its loading position, the co-acting relationship of the lever 18, roller 19, shaft 9 and cylinder 8, holds the tail gate in a closed position in relation to the truck or dump body. When the body has been filled and it is desired to dump the contents therefrom, the cylinder E is operated in the conventional manner, which operation elevates the front end of the dump bed, simultaneously lowering or opening the tail gate F commensurately with the degree of elevation of the dump body, and when the body has been elevated to a fully raised position, the tail gate F is in a plan parallel to the bottom of the body, allowing all of the contents of the body to slide thereover. As the elevating operation takes place, the roller 19 rides down the race 20 and the tail gate and other movable parts assume the positions shown by the dotted lines in Figure 1. After the bed has been emptied the cylinder E is operated and the bed returned to its initial or loading position. This returning action of the dump bed causes the roller 19 to roll up the face of the race 20 actuating the cylinders 8 by the rotation of the shaft 16 and the arms 15 depending therefrom, which in turn compress the springs 12 moving the rods 9 and elevating the tail gate E by the arms 10, closing the tail gate for another loading.

Having thus described my invention, I desire to secure by Letters Patent and claim:

1. An automatic tail gate for dump trucks comprising, a tail gate pivoted at its lower edge to the truck body; levers extending down from the lower edge of said gate; shafts connected with the ends of said levers and extending forwardly under said truck body; tubular members in which said shafts ride; springs mounted with tension between the shafts and tubular members; a control shaft mounted transversely of said truck body; crank arms extending from said control shaft and connected with the other ends of said tubular members; a lever extending down from said control shaft; and a track mounted on the truck chassis and on which the end of the lever is adapted to engage to cause the tail gate to open when the dump body is elevated for dumping and to close when it is returned to loading position.

2. A control means for tail gates comprising, a shaft to be mounted longitudinally under the dump bed with one end of the shaft bifurcated; a lever extending down from the tail gate and mounted between the bifurcated ends of said shaft; a tubular member in which the forward end of said shaft is carried; a spring carried on said shaft between a spring stop on said shaft and the end of the tubular member; and actuating means attached to the forward end of said tubular member to move the tubular member longitudinally when the dump body bed is elevated and lowered.

3. A control for tail gates on dump bodies comprising levers extended down from the tail gate; horizontal shafts connected onto the lower ends of said levers; tubular members in which the free ends of the horizontal shafts are carried; spring stops carried on said horizontal shafts; springs carried on said horizontal shafts between the end of the tubular members and the spring stops to permit complete forcing open of the tail gate regardless of position of body; a cross shaft having crank arms extended and connected to said tubular members the rotation of the cross shaft to move the tubular members longitudinally to open or close the tail gate; and means to partially rotate the cross shaft when the dump body is elevated and lowered.

PHILIP R. FAIRBANKS.